United States Patent
Jung

(10) Patent No.: US 6,567,280 B2
(45) Date of Patent: May 20, 2003

(54) METHOD AND CIRCUIT FOR DETECTING LIGHT LOAD MODE OF SWITCHING POWER SUPPLY SYSTEM

(75) Inventor: Wang Kuo Jung, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 09/970,372

(22) Filed: Oct. 3, 2001

(65) Prior Publication Data

US 2002/0057081 A1 May 16, 2002

(30) Foreign Application Priority Data

Nov. 10, 2000 (TW) .......................... 89123894 A

(51) Int. Cl.[7] .............................................. H02M 3/335
(52) U.S. Cl. ........................ 363/19; 363/97; 363/21.14; 363/131
(58) Field of Search ............................. 363/19, 97, 18, 363/20, 131, 21.14, 21.16

(56) References Cited

U.S. PATENT DOCUMENTS

| | | | | |
|---|---|---|---|---|
| 4,758,937 A | * | 7/1988 | Usui et al. ..................... | 363/19 |
| 4,763,235 A | * | 8/1988 | Morita ........................ | 363/19 |
| 5,675,479 A | * | 10/1997 | Tani et al. .................... | 363/19 |
| 6,101,103 A | * | 8/2000 | Miyazaki et al. ............. | 363/19 |
| 6,185,112 B1 | * | 2/2001 | Nishida et al. ............... | 363/19 |
| 6,198,637 B1 | * | 3/2001 | Hosotani et al. ............. | 363/19 |

* cited by examiner

Primary Examiner—Bao Q. Vu
(74) Attorney, Agent, or Firm—Alston & Bird LLP

(57) ABSTRACT

A method and a circuit for detecting a light load mode of a switching power supply system are provided. The switching power supply system has a first winding, a second winding, a third winding having a voltage being in proportion to an output voltage of the second winding, and a signal converting device electrically connected to the third winding. The method includes steps of measuring a voltage of the signal converting device, and determining the switching power supply system being under the light load mode when the voltage of the signal converting device is smaller than a predetermined threshold voltage.

7 Claims, 3 Drawing Sheets

METHOD AND CIRCUIT FOR DETECTING LIGHT LOAD MODE OF SWITCHING POWER SUPPLY SYSTEM

FIELD OF THE INVENTION

The present invention relates to a method and circuit for detecting a light load mode of a switching power supply system, and more particularly to the method and circuit for detecting a light load mode of a switching power supply system by using an assistant winding.

BACKGROUND OF THE INVENTION

Switching power supply systems are generally used in electrical apparatuses, such as the computer systems or the measuring systems, for providing a stable direct current (DC). Therefore, a switching power supply system having a light load and power saving mode has been developed because of the severe standard of environment protection gradually, such as FCC and other European standard. Consequently, the power supply system capable of selectively entering the light load and saving power mode would be more important to fabricate the electrical apparatuses.

Nowadays, a power saving mode is provided in many electrical apparatuses for avoiding the unnecessary power consumption from the power supply system and increasing the life-time of the power supply system when the system load is excessively light. Furthermore, the method for switching the system to a light load and power saving mode is performed by an application specific integrated circuit (ASIC) to switch the system operation mode such as switching to the related power saving circuit or reducing the switching frequency according to the conventional switching power supply system.

In the above-mentioned description, the conventional method for switching the light load and power saving mode is implemented by detecting a feedback voltage signal change of the control circuit via the application specific integrated circuit (ASIC). However, the method has the following drawbacks:

1. The specific IC material such as ASIC could be easily deficient to increase the cost thereof; and
2. The feedback voltage signal change is too small to be effective, and a vibration and a noise may be generated when switching is under the high load.

It is therefore tried by the applicant to deal with the above situation encountered by the prior art.

SUMMARY OF THE INVENTION

It is therefore an object of the present invention to provide a method and a circuit for detecting a light load mode of a switching power supply system by employing an assistant winding to determine whether the switching power supply system is under a light load mode to activate a power saving circuit.

According to an aspect of the present invention, there is provided a method for detecting a light load mode of a switching power supply system, wherein the switching power supply system has a first winding, a second winding, a third winding having a voltage being in proportion to an output voltage of the second winding, and a signal converting device electrically connected to the third winding. The method includes steps of measuring a voltage of the signal converting device and determining the switching power supply system being under the light load mode when the voltage of the signal converting device is smaller than a predetermined threshold voltage.

Preferably, the third winding is an assistant winding, and an outputted signal from the assistant winding is processed via the signal converting device and provided for determining whether the switching power supply system is under said light load mode.

Preferably, the first winding and the second winding are respectively a primary winding and a secondary winding of a transformer in the switching power supply system.

Preferably, the switching power supply system further includes a detector electrically connected to the signal converting device for determining whether the switching power supply system is under the light load mode.

Preferably, the method further includes a step of activating a power saving circuit when the switching power supply system is under the light load mode.

According to another aspect of the present invention, there is provided a method for activating a power saving circuit of a switching power supply system in response to the magnitude of a load, wherein the switching power supply system has a first winding, a second winding connected to the load, a third winding having a voltage being in proportion to an output voltage of the second winding, and a signal converting device electrically connected to the third winding. The method includes steps of measuring a voltage of the signal converting device and determining whether the switching power supply system is under a light load mode, outputting a power saving signal representative of the light load mode when the output voltage of the signal converting device is smaller than a predetermined threshold voltage, and activating the power saving circuit in response to the power saving signal.

According to another aspect of the present invention, there is provided the circuit for detecting a light load mode of a switching power supply system, wherein the switching power supply system has a first winding, a second winding, and a third winding having a voltage being in proportion to an output voltage of the second winding. The circuit includes a signal converting device electrically connected to the third winding for generating a voltage in response to the magnitude of a load which is connected to the second winding and a detector electrically connected to the signal converting device for outputting a signal representative of the light load mode when the voltage of the signal converting device is smaller than a predetermined threshold voltage.

According to another aspect of the present invention, the switching power supply system includes a first winding, a second winding, a third winding having a voltage being in proportion to an output voltage of the second winding, a signal converting device electrically connected to the third winding for generating a voltage variation in response to the magnitude of a load which is connected to the second winding, a detector electrically connected to the signal converting device for outputting a power saving signal when the voltage of the signal converting device is smaller than a predetermined threshold voltage, and a power saving circuit for receiving the power saving signal for performing a power saving mode The present invention may best be understood through the following descriptions with reference to the accompanying drawings, in which:

DETAILED DESCRIPTION OF THE PREFERRED EMBODIMENTS

In the demand for saving energy, most design developments for a power supply system are required to have a light load mode or a power saving mode. Moreover, a voltage outputted from an assistant power supply is in proportion to a magnitude of an output load. The relationship there between the assistant power voltage and the load is shown in FIG. 1.

Figure 1:
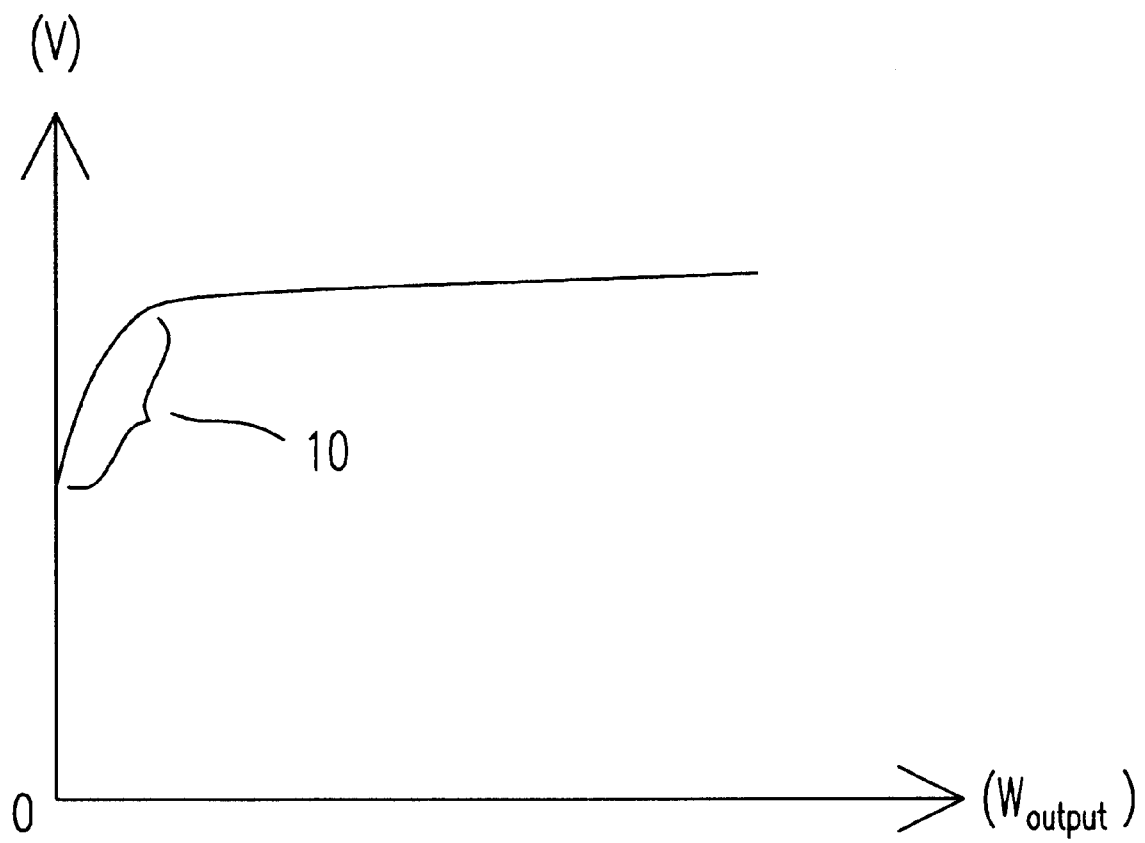
FIG. 1 is a diagram illustrating the relation between a voltage for being converting by a switching assistant winding and an output side load.
Figure 2:
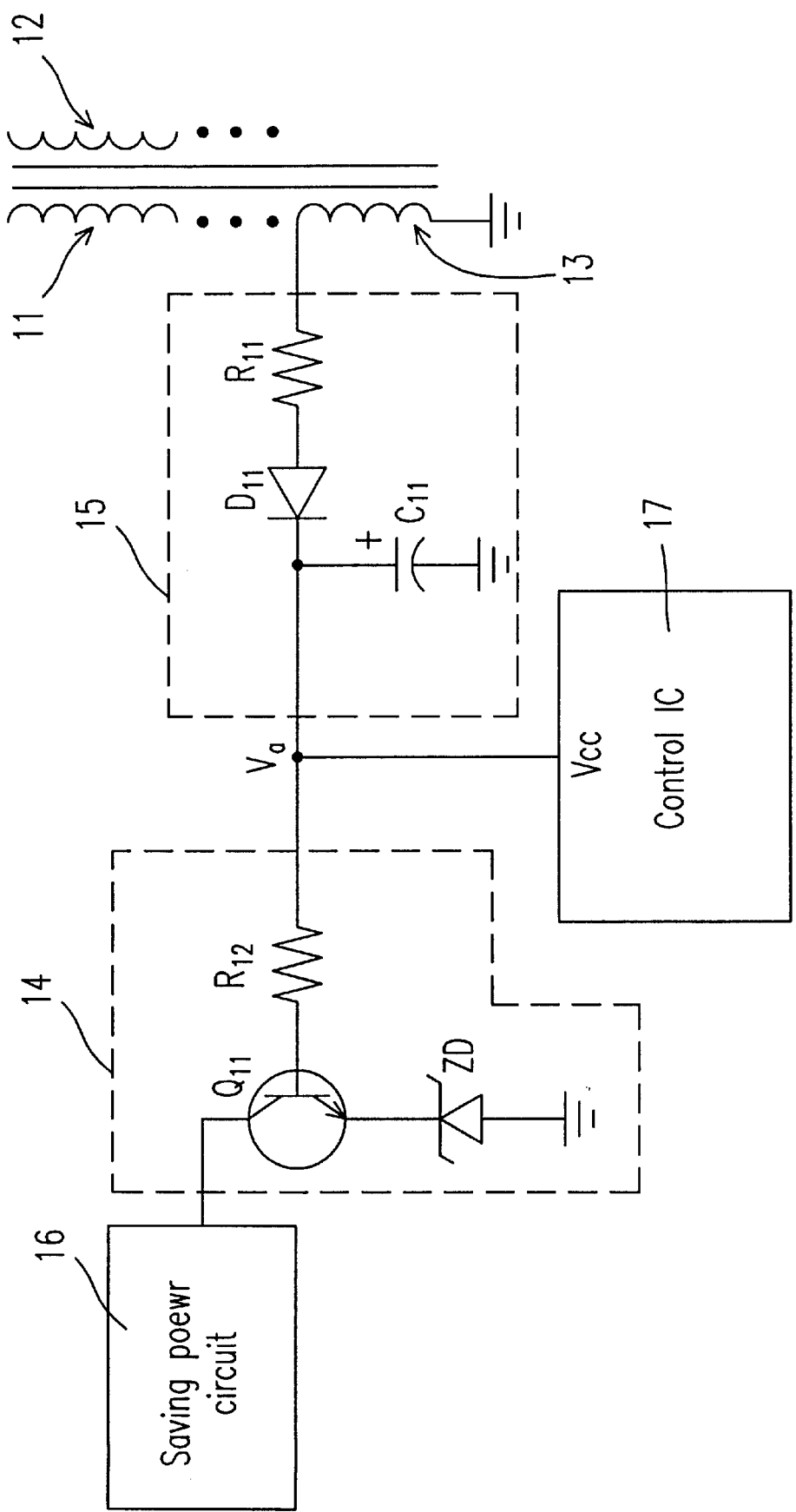
FIG. 2 is a view showing a circuit for detecting a light load mode of a switching power supply system according to the first preferred embodiment of the present invention.

The method of the present invention is provided on basis of the characteristic that the assistant power supply has a high voltage variation ratio 10 (high $dV/dW_{output}$) corresponding to the output work power, as shown in FIG. 1, when the power supply system is under the light load mode. Further, a predetermined threshold voltage of a voltage condition for determining whether the power supply system is under the light load mode is defined at the middle point of a curve in the voltage variation ratio 10. An output voltage is measured by detecting a rectified circuit D11 to be outputted to a capacitor C11, as shown in FIG. 2. When the output voltage, which is equal to a voltage outputted from the capacitor C11, is smaller than the predetermined threshold voltage, the power supply system is determined in a light load mode or no load. Therefore, a power saving circuit 16 of the switching power supply could be performed to switch under the light load mode.

FIG. 2 shows a detecting circuit for detecting a light load mode of a switching power supply system according to the first preferred embodiment of the present invention. A switching power supply system usually has a system transformer (not shown) including a first winding 11, a second winding 12 and an assistant winding 13. Furthermore, the first winding 11, i.e. the primary winding of the system transformer, is connected to the system power supply (not shown), the second winding 12, i.e. the secondary winding of the system transformer, is connected to a load (not shown), and the assistant winding 13 is used to provide power to a control IC 17 and to feedback the load mode to be identified by a detector 14 for detecting a light load mode of the switching power supply system. Moreover, a signal converting device 15 electrically connected to the assistant winding 13 for generating a voltage in response to the magnitude of the load and the detector 14 electrically connected to the signal converting device 15 for outputting a signal representative of the light load mode when the voltage as Va between the signal converting device 15 and the detector 14 is smaller than a predetermined threshold voltage.

In FIG. 2, a Zener diode ZD is defined as a compared voltage level to activate the power saving circuit 16 to switch the power supply system to a saving power mode when the voltage of Va is smaller than the voltage level of the Zener diode ZD. Meanwhile, the voltage level of the Zener diode ZD is preferably determined at the middle point of the high $dV/dW_{output}$ curve 10 in order to reduce the influences of components' inaccuracy on switching light load mode in the switching power supply system.

Figure 3:
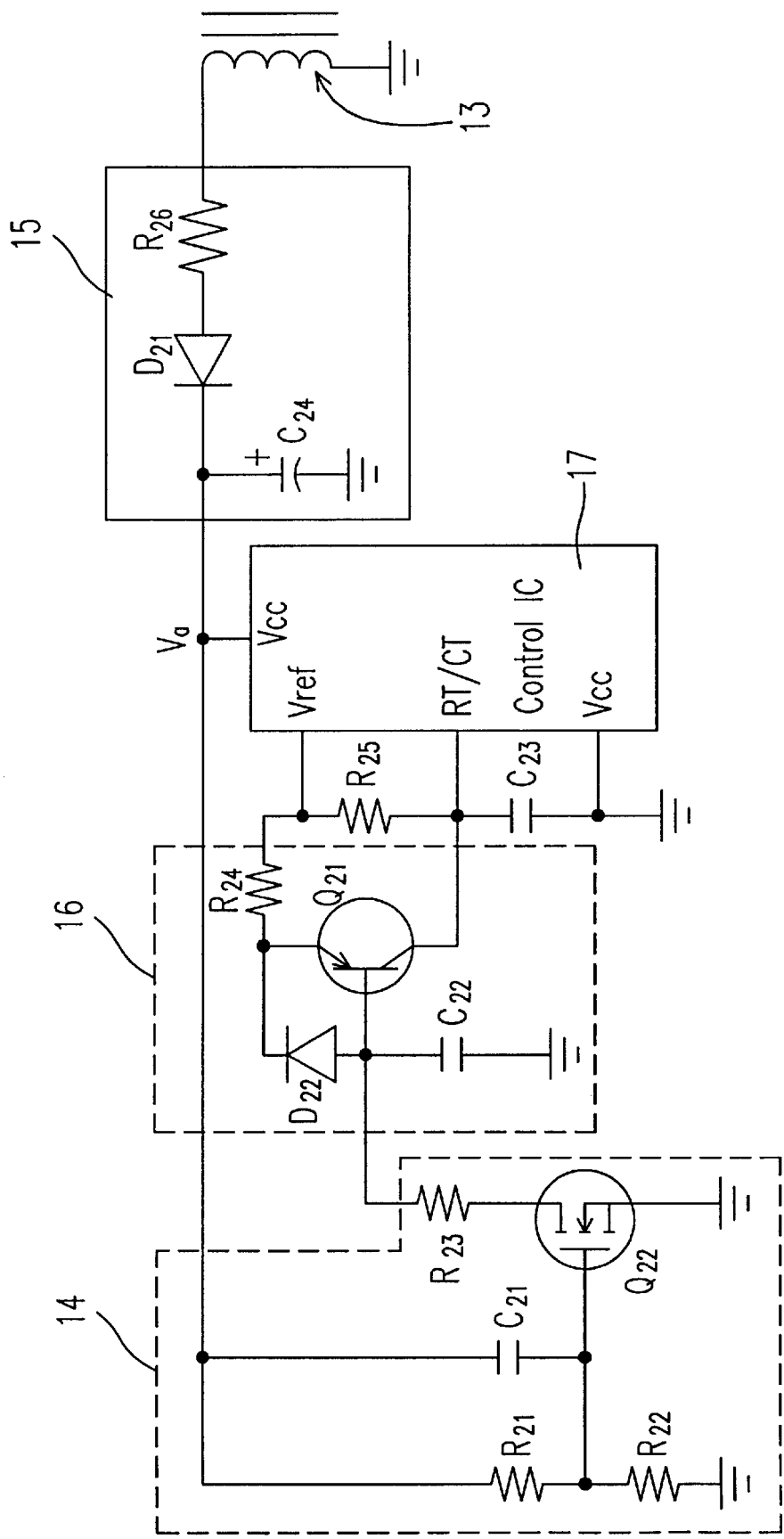
FIG. 3 is a view showing the circuit for detecting the light load mode of the switching power supply system according to the second preferred embodiment of the present invention.

FIG. 3 shows a circuit for detecting a light load mode of a switching power supply system according to the second preferred embodiment of the present invention. A voltage signal as FIG. 1 outputted from the signal converting device 15 is divided by resistors R21 and R22 and the voltage signal would activate transistors Q21 and Q22 to connect a resistor R24 dynamically be parallel to a resistor R25 for controlling a clock of the control IC 17. Therefore, the effect of heavy load high frequency (the resistor R24 is parallel to the resistor R25) and light load low frequency (the resistor R24 is not parallel to the resistor R25) would be achieved.

It is understood that the method and the circuit for detecting the light load mode and the power saving mode according to the present invention is suitable for the switching power supply system. Furthermore, the method and the circuit for detecting light load mode according to the present invention has the advantages as follows:

1. The assistant winding can feedback the load for being determined by the detecting circuit, and could be become the assistant power supply by the signal converting device for the control circuit.
2. The switching point between the light load mode and the heavy load mode could be provided under the extreme low output power. Therefore, the noise due to the vibration generated form the switching mode power supply system could be avoided.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

I claim:

1. A method for detecting a light load mode of a switching power supply system, wherein said switching power supply system has a first winding connected to a transformer primary side, a second winding connected to a transformer secondary side, a third winding connected to the transformer primary side having a voltage being in proportion to an output voltage of said second winding, and a signal converting device electrically connected to said third winding in which said third winding is an assistant winding, and an output signal outputted from said assistant winding is processed via said signal converting device and provided for determining whether said switching power supply system is under said light load mode, comprising steps of:

measuring a voltage of said signal converting device based on the output signal from said assistant winding; and determining said switching power supply system being under said light load mode when said voltage of said signal converting device is smaller than a predetermined threshold voltage.

2. The method according to claim 1, wherein said switching power supply system further comprises a detector electrically connected to said signal converting device for determining whether said switching power supply system is under said light load mode.

3. The method according to claim 1, further comprising a step of activating a power saving circuit when said switching power supply system is under said light load mode.

4. A method for activating a power saving circuit of a switching power supply system in response to the magnitude of a load, wherein said switching power supply system has a first winding connected to a transformer primary side, a second winding connected to a transformer secondary side, a third winding connected to the transformer primary side having a voltage being in proportion to an output voltage of said second winding, and a signal converting device electrically connected to said third winding in which said third winding is an assistant winding electrically isolated from said second winding, and an output signal outputted form said assistant winding is processed via said signal converting device and provided for determining whether said switching power supply system is under said light load mode, comprising steps of:

measuring a voltage of said signal converting device based on the output signal from said assistant winding and determining whether said switching power supply system is under a light load mode;

outputting a power saving signal representative of said light load mode when said voltage of said signal converting device is smaller than a predetermined threshold voltage; and activating said power saving circuit in response to said power saving signal.

5. A circuit for detecting a light load mode of a switching power supply system, wherein said switching power supply system has a first winding connected to a transformer primary side, a second winding connected to a transformer secondary side, a third winding connected to the transformer primary side having a voltage being in proportion to an output voltage of said second winding, comprising:

a signal converting device electrically connected to said third winding for generating a voltage based on the output signal from said assistant winding in response to the magnitude of a load which is connected to said second winding; and a detector electrically connected to said signal converting device for outputting a signal representative of said light load mode when said voltage of said signal converting device is smaller than a predetermined threshold voltage, wherein said third winding is an assistant winding, and an output signal outputted from said assistant winding is processed via said signal convening device and provided for determining whether said switching power supply system is under said light load mode.

6. The circuit according to claim 5, wherein said switching power supply system further comprises a detector electrically connected to said signal converting device for determining whether said switching power supply system is under said light load mode.

7. A switching power supply system, comprising:

a first winding connected to a transformer primary side;

a second winding connected to a transformer secondary side;

a third winding having a voltage being in proportion to an output voltage of said second winding connected to the transformer primary side;

a signal convening device electrically connected to said third winding for generating a voltage based on the output signal from said assistant winding in response to the magnitude of a load which is connected to said second winding;

a detector electrically connected to said signal convening device for outputting a power saving signal when said voltage of said signal convening device is smaller than a predetermined threshold voltage; and a power saving circuit for receiving said power saving signal for performing a power saving mode, wherein said third winding is an assistant winding, and an output signal outputted from said assistant winding is processed via said signal convening device and provided for determining whether said switching power supply system is under said light load mode.

\* \* \* \* \*

UNITED STATES PATENT AND TRADEMARK OFFICE
CERTIFICATE OF CORRECTION

PATENT NO.   : 6,567,280 B2
DATED        : May 20, 2003
INVENTOR(S)  : Wang

It is certified that error appears in the above-identified patent and that said Letters Patent is hereby corrected as shown below:

Column 6,
Lines 5, 22, 27, 29 and 35, "convening" should read -- converting --.

Signed and Sealed this

Twenty-second Day of July, 2003

JAMES E. ROGAN
*Director of the United States Patent and Trademark Office*